United States Patent
Wang et al.

(10) Patent No.: US 11,606,568 B1
(45) Date of Patent: Mar. 14, 2023

(54) END-OF-BLOCK DETECTION OF QUANTIZED TRANSFORM COEFFICIENT MATRICES IN VIDEO ENCODING

(71) Applicant: Meta Platforms, Inc., Menlo Park, CA (US)

(72) Inventors: Zhao Wang, Newark, CA (US); Yunqing Chen, Los Altos, CA (US); Baheerathan Anandharengan, Milpitas, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/406,001

(22) Filed: Aug. 18, 2021

(51) Int. Cl.
| | | |
|---|---|---|
| *H04N 19/18* | (2014.01) | |
| *H04N 19/129* | (2014.01) | |
| *H04N 19/64* | (2014.01) | |
| *H04N 19/124* | (2014.01) | |

(52) U.S. Cl.
CPC ........... *H04N 19/18* (2014.11); *H04N 19/124* (2014.11); *H04N 19/129* (2014.11); *H04N 19/64* (2014.11)

(58) Field of Classification Search
CPC ..... H04N 19/124; H04N 19/18; H04N 19/129
See application file for complete search history.

(56) References Cited

U.S. PATENT DOCUMENTS

| | | | |
|---|---|---|---|
| 9,106,913 B2 | 8/2015 | Sole et al. | |
| 9,712,844 B2 | 7/2017 | Nguyen et al. | |
| 10,085,024 B2 | 9/2018 | Yu et al. | |
| 10,382,758 B2 | 8/2019 | Han et al. | |
| 10,609,421 B2 | 3/2020 | Kuusela et al. | |
| 2014/0362925 A1* | 12/2014 | Nguyen | H03M 7/4075 375/240.18 |
| 2019/0191164 A1* | 6/2019 | Han | H04N 19/129 |
| 2020/0359055 A1* | 11/2020 | Matsunaga | H04N 19/91 |
| 2021/0006807 A1* | 1/2021 | Zhang | H04N 19/91 |

\* cited by examiner

*Primary Examiner* — Zhubing Ren
(74) *Attorney, Agent, or Firm* — Van Pelt, Yi & James LLP (57) ABSTRACT

A video encoder comprises an application-specific integrated circuit (ASIC) video encoding unit configured to receive via an interface in a processing order, quantized transform coefficients for a transform unit of a frame of a video being encoded. The ASIC unit is configured to analyze at least a portion of the quantized transform coefficients in the processing order to identify one or more end-of-block candidate positions in the processing order. The ASIC unit is configured to translate the one or more end-of-block candidate positions for the at least a portion of the quantized transform coefficients to one or more scan order versions of the one or more end-of-block candidate positions. The ASIC unit is configured to determine a true end-of-block position for the quantized transform coefficients using the one or more scan order versions of the one or more end-of-block candidate positions.

20 Claims, 7 Drawing Sheets

```
assign vp9_iscan_8x8 = '{
  0,  2,  5,  9, 14, 22, 31, 37,
  1,  4,  8, 13, 19, 26, 38, 44,
  3,  6, 10, 17, 24, 30, 42, 49,
  7, 11, 15, 21, 29, 36, 47, 53,
 12, 16, 20, 27, 34, 43, 52, 57,
 18, 23, 28, 35, 41, 48, 56, 60,
 25, 32, 39, 45, 50, 55, 59, 62,
 33, 40, 46, 51, 54, 58, 61, 63
};
```

END-OF-BLOCK DETECTION OF QUANTIZED TRANSFORM COEFFICIENT MATRICES IN VIDEO ENCODING

BACKGROUND OF THE INVENTION

A video coding format is a content representation format for storage or transmission of digital video content (such as in a data file or bitstream). It typically uses a standardized video compression algorithm. Examples of video coding formats include H.262 (MPEG-2 Part 2), MPEG-4 Part 2, H.264 (MPEG-4 Part 10), HEVC (H 265), Theora, RealVideo RV40, VP9, and AV1. A video codec is a device or software that provides encoding and decoding for digital video. Most codecs are typically implementations of video coding formats Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. For example, VP9 offers up to 50% more compression compared to its predecessor. However, with higher compression rates come higher computational complexity; therefore, improved hardware architecture and techniques in video coding would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
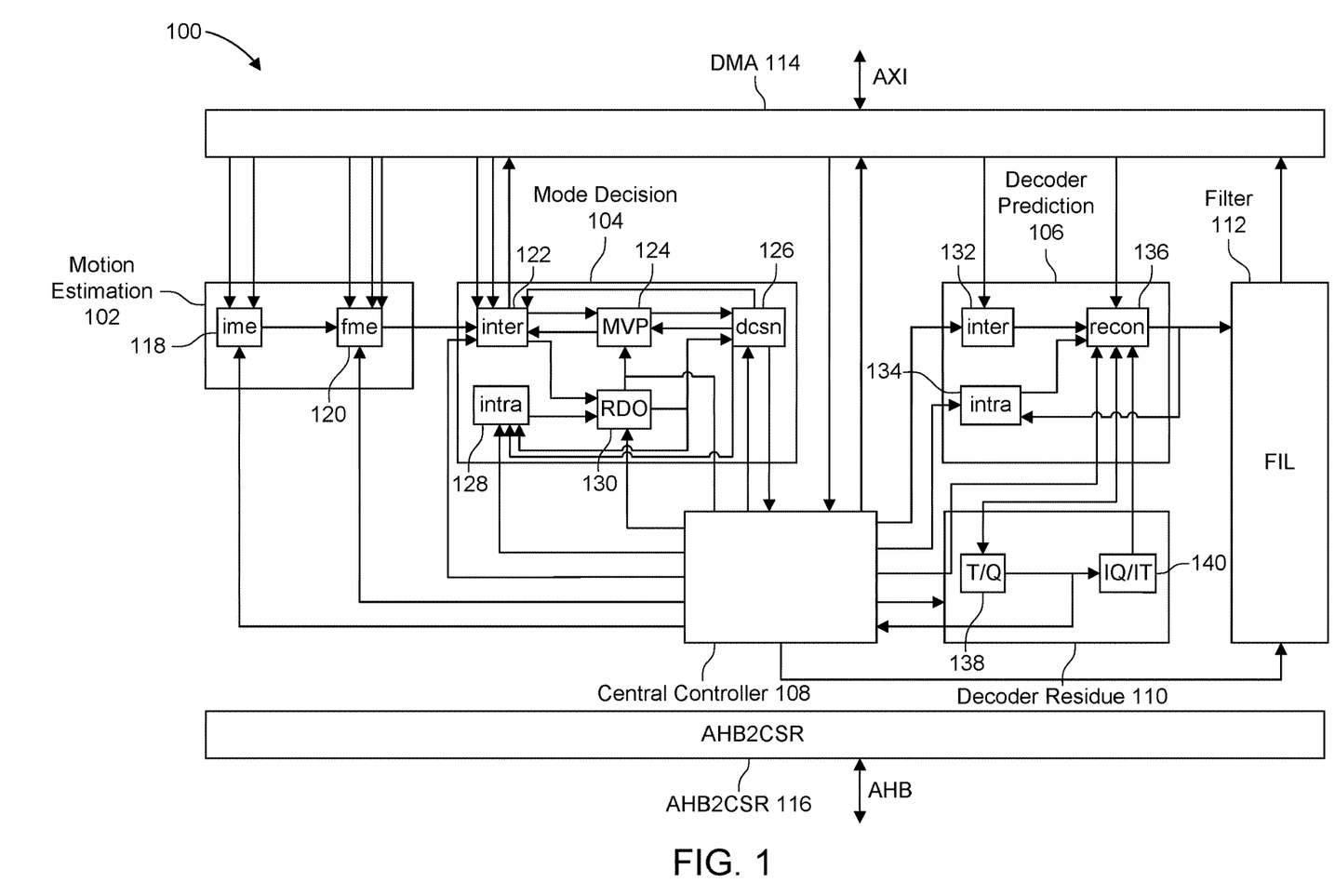
FIG. 1 illustrates a block diagram of an embodiment of a video encoder 100.

FIG. 1 illustrates a block diagram of an embodiment of a video encoder 100.

For example, video encoder 100 supports the video coding format VP9. However, video encoder 100 may also support other video coding formats as well, such as H.262 (MPEG-2 Part 2), MPEG-4 Part 2, H.264 (MPEG-4 Part 10), HEVC (H.265), Theora and Real Video RV40.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks, e.g., prediction units or partitions within a macroblock. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously encoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128×128 or 64×64 pixel superblocks). Each superblock has a partition that specifies how it is to be encoded. Superblocks may be divided into smaller blocks according to different partitioning patterns. This allows superblocks to be divided into partitions as small as 4×4 pixels.

Besides using different block sizes for prediction, different prediction modes may use different settings in inter prediction and intra prediction. For example, there are different inter prediction modes corresponding to using different reference frames, which have different motion vectors. For intra prediction, the intra prediction modes depend on the neighboring pixels, and in VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+ $\lambda$*rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Figure 2:
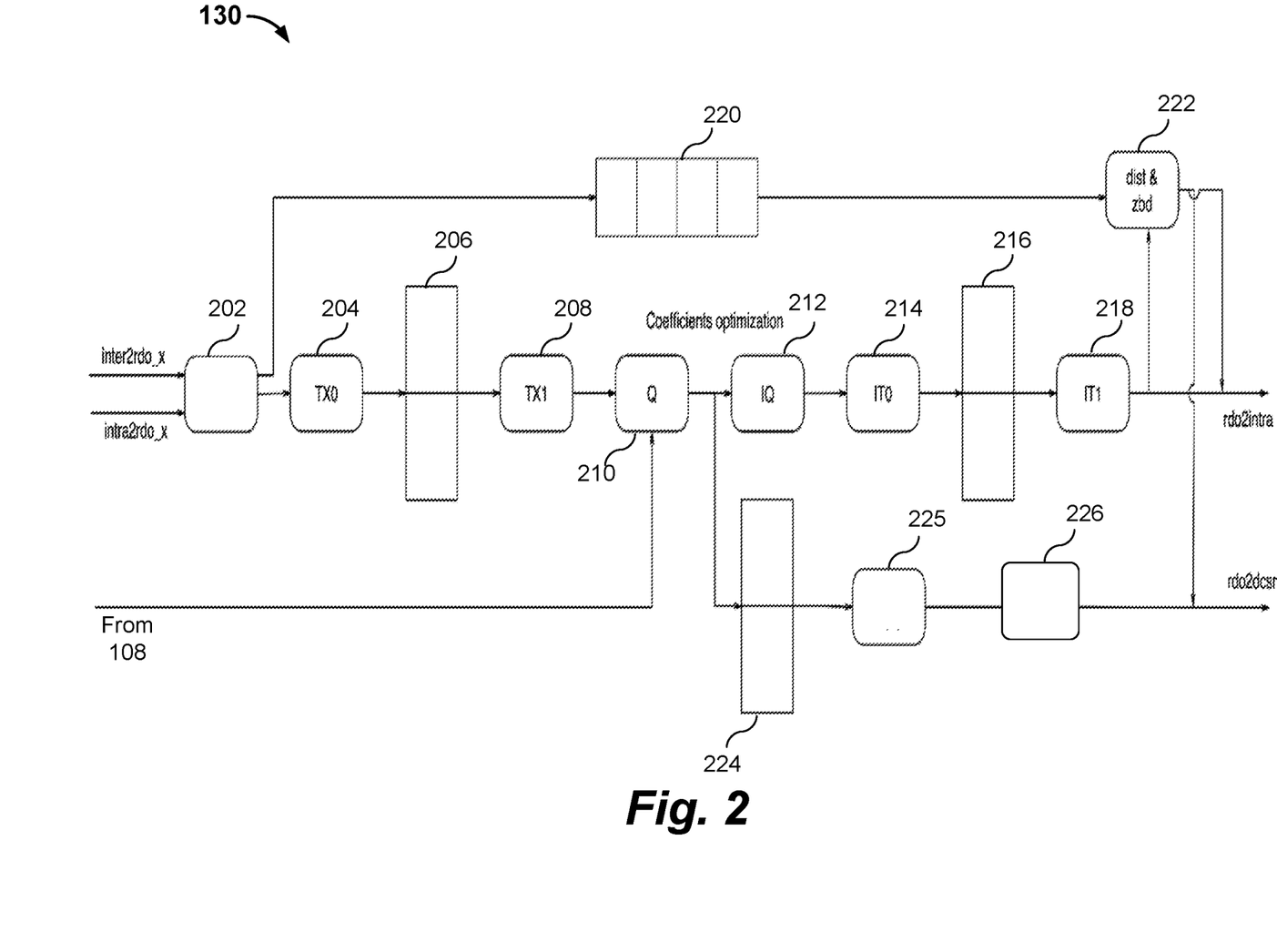
FIG. 2 illustrates an exemplary block diagram of RDO module 130.

FIG. 2 illustrates an exemplary block diagram of RDO module 130. RDO module 130 includes an arbiter and buffer module 202 for receiving inputs from inter prediction module 122 and intra prediction module 128, respectively. The received inputs include the residue data (i.e., the differences between the source/original pixels and the predicted pixels) corresponding to different prediction modes. The residue data is referred to as the original residue, given by original residue=source pixels−predicted pixels. These residues are then transformed using a 2-dimensional transform performed by two stages of transform modules, TX0 module 204 and TX1 module 208, with a transpose operation module 206 in between. After the transform, the transformed values form a transform block, which is a square transform coefficient matrix with a DC coefficient and a plurality of AC coefficients. The transform coefficients are then compressed further by quantizing the coefficients via a quantization module 210.

Distortion may be based on the original residue=source pixels−predicted pixels and the reconstruction residue. For example, one metric is the sum of the squared estimate of errors (SSE), the sum of the squares of the original residue. In order to estimate the amounts of distortion experienced by the decoder, a number of processing steps are performed on the quantized coefficients. Inverse quantization (i.e., dequantization) is performed by a dequantization module 212 and an inverse transform is performed by two stages of inverse transform modules, IT0 module 214 and IT1 module 218, with a transpose operation module 216 in between. The results after the inverse transform are then compared with the original block of residual pixels at the output of a buffer 220 by a distortion estimation module 222, such that the amounts of distortion corresponding to different prediction modes are determined and sent to decision module 126.

The rates associated with sending the data corresponding to a block in a bitstream are also estimated by RDO module 130. One component of the rate is the coefficient rate, which is the rate associated with sending the quantized coefficients in the bitstream. The quantized coefficients at the output of quantization module 210 are sent to a ping-pong buffer 224 and a token rate module 226, where the rate associated with a particular block may be estimated. The rates are estimated by token rate module 226 without performing the actual encoding, because the actual encoding of the bitstream is computationally intensive and requires additional information, e.g., neighbor dependency or other neighbor information, which is not available. Coefficient rate estimation by token rate module 226 is performed for every transform unit (TU) that goes through the RDO process in mode decision module 104. The rate estimation is based on the quantized coefficients.

Because the purpose of the transform is to concentrate the energy in only a few significant coefficients, after quantization, the non-significant transform coefficients are reduced to zeros or near zeros, and therefore the quantized transform coefficient matrix typically has only a non-zero DC coefficient and a small number of non-zero AC coefficients.

The first coefficient is the DC coefficient and its rate is computed based on a function of the coefficient value, the neighbor context, and the token cost. The rate of an AC coefficient is computed based on a function of the coefficient value, the neighbor context, and the token cost. The coefficients are evaluated based on a scan order defined by a scan table that specifies a path through the quantized transform coefficient matrix that is most likely to find all non-zero coefficients while encountering as few zero coefficients as possible. Different video encoding formats, modes, and transform types may use a different scan order.

With continued reference to FIG. 2, before the token rate is calculated by token rate module 226 for each transform unit, the end-of-block (EOB) is detected by an EOB detection module 225, as will be described in greater detail below. EOB detection module 225 makes sure that the last residue is a non-zero residue. It would be desirable to design a hardware implementation of the EOB detection module 225 that can efficiently support different transform sizes and throughputs.

In the present application, a video encoder is disclosed. The video encoder comprises an interface. The video encoder further comprises an application-specific integrated circuit (ASIC) video encoding unit configured in hardware to receive via the interface in a processing order, a plurality of quantized transform coefficients for a transform unit of a frame of a video being encoded. The ASIC video encoding unit is further configured to analyze at least a portion of the plurality of quantized transform coefficients in the processing order to identify one or more end-of-block candidate positions in the processing order. The ASIC video encoding unit is further configured to translate the one or more end-of-block candidate positions for the at least a portion of the plurality of quantized transform coefficients to one or more scan order versions of the one or more end-of-block candidate positions. The ASIC video encoding unit is further configured to determine a true end-of-block position for the plurality of quantized transform coefficients for the transform unit using the one or more scan order versions of the one or more end-of-block candidate positions.

A specific scan order is associated with the transform unit of quantized transform coefficients. The specific scan order is determined based on a plurality of parameters, including the video coding format standard, the prediction mode, and the transform type. The scan order may be defined by a scan table that specifies a path through the quantized transform coefficient matrix that is most likely to find all non-zero coefficients while encountering as few zero coefficients as possible. The quantized transform coefficients are expected to be processed based on the specific scan order.

Figure 3A:
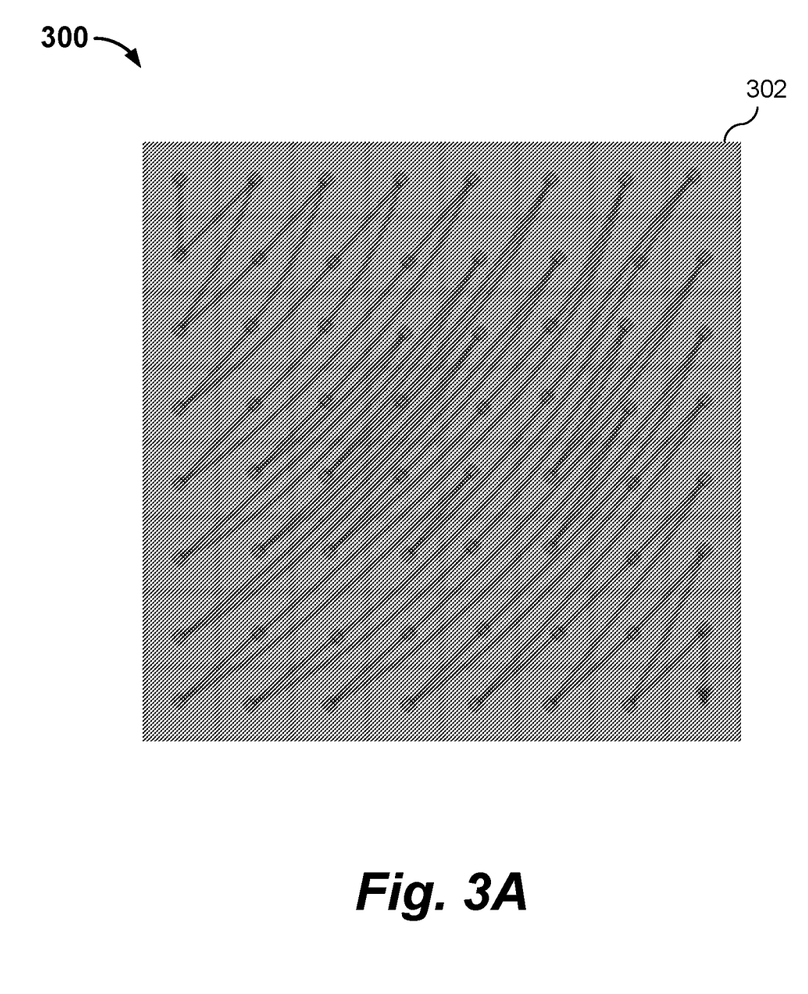
FIG. 3A illustrates an example of a quantized transform coefficient scan order 300 for VP9.

FIG. 3A illustrates an example of a quantized transform coefficient scan order 300 for VP9. Scan order 300 is a zig-zag path that traverses the 8×8 quantized transform coefficient matrix 302 from the lowest frequency in the upper left corner (DC coefficient), where energy tends to cluster, towards the highest frequency in the lower right corner. The scanned quantized transform coefficients in the scan order may be represented in a one-dimensional string and an EOB code marks the location in the string where all succeeding coefficients are zero. The EOB comprises a position of a last non-zero coefficient along the scan order path. The EOB is the index or position of the last non-zero coefficient in the one-dimensional string. For example, the one-dimensional string may be [79 0 −1 −1 −1 −1 0 0 −1 (EOB)], and the EOB is eight. All the coefficients (both non-zero coefficients and zero coefficients) are needed for calculating the rate, but all the zero coefficients after the EOB are not used.

Figure 3B:
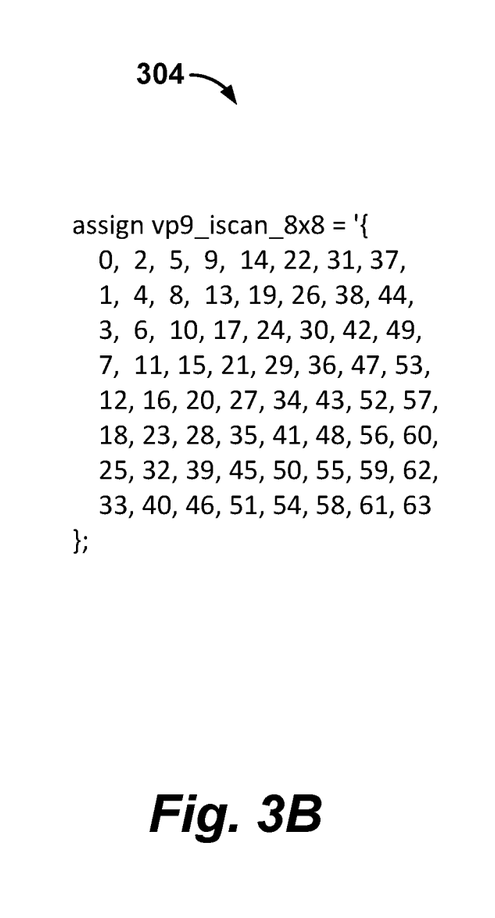
FIG. 3B illustrates a mapping table 304 that converts the indices of the coefficients in quantized transform coefficient matrix 302 to their corresponding scan order indices.

In hardware, coefficients are not processed in scan order, but in raster order or in columns. In a raster scan, a two-dimensional rectangular raster is mapped into a one-dimensional raster, wherein the entry point of the one-dimensional raster starts from the first row of the two-dimensional raster, and the scanning proceeds to the second row, then the third row, and so on. Each raster row is scanned in left to right order. Since the coefficients are processed in raster order but the EOB is determined based on the scan order, to find out the true EOB, the indices of the coefficients in the coefficient matrix are converted to scan order indices using a mapping table. FIG. 3B illustrates a mapping table 304 that converts the indices of the coefficients in quantized transform coefficient matrix 302 to their corresponding scan order indices. For example, indices 0, 1, and 2 are the first three elements of the first row of matrix 302 starting from the left, and they are converted to scan order indices of 0, 2, and 5, respectively. This is because elements 0, 1, and 2 are the first, third, and sixth coefficients along the zig-zag scan order 300 path. In addition, in hardware, only a portion of the rows may be processed within one cycle, but the true EOB can only be determined after all the rows of the coefficients have been processed. Therefore, a candidate EOB is being updated after each cycle, and the true EOB is determined after the entire quantized transform coefficient matrix has been processed.

Figure 4:
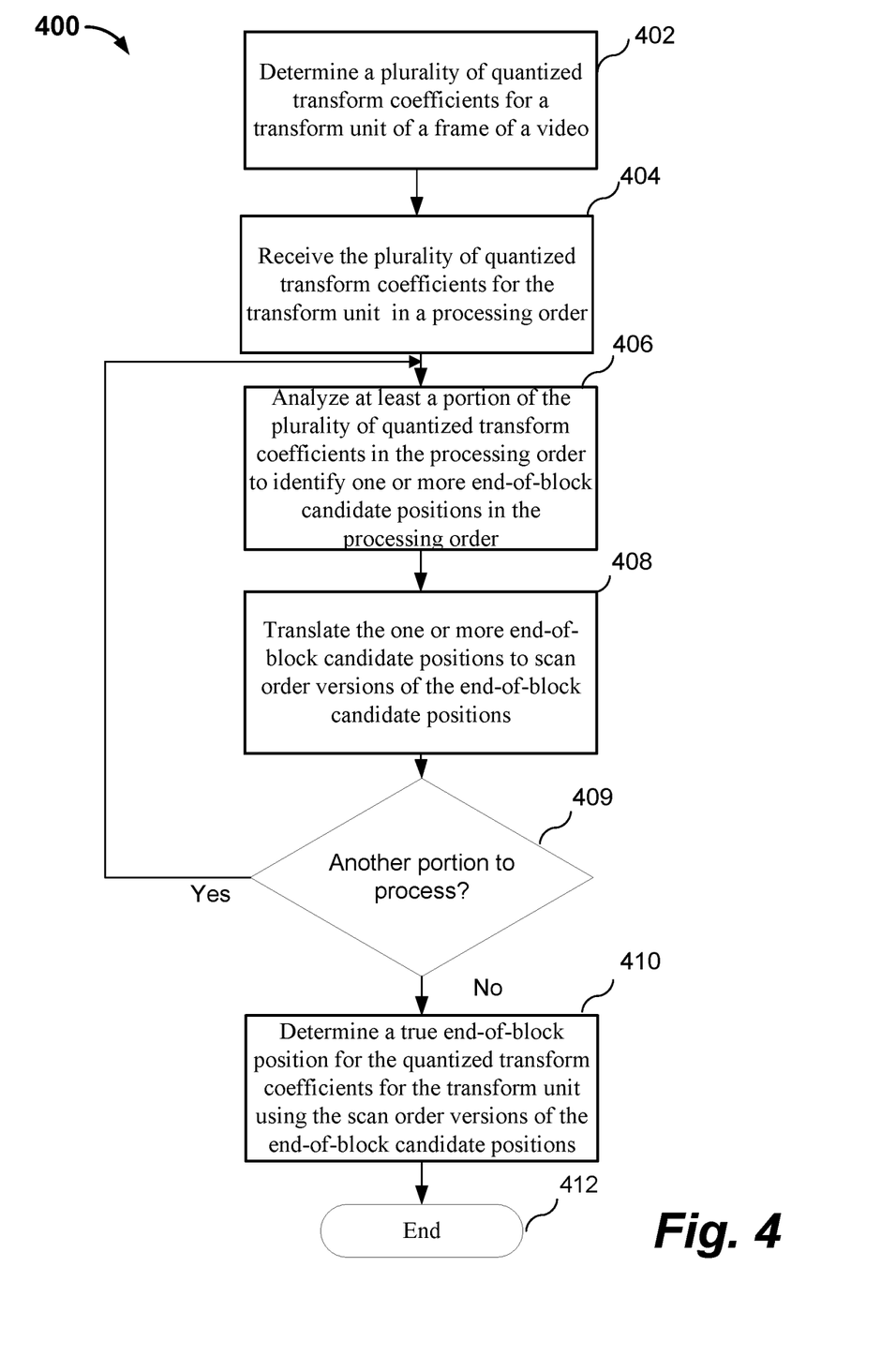
FIG. 4 illustrates an exemplary process 400 for determining an end-of-block for a transform unit of quantized transform coefficients.

FIG. 4 illustrates an exemplary process 400 for determining an end-of-block for a transform unit of quantized transform coefficients. In some embodiments, process 400 may be performed by RDO module 130, including EOB detection module 225.

At 402, a plurality of quantized transform coefficients for a transform unit of a frame of a video being encoded are determined. RDO module 130 includes an arbiter and buffer module 202 for receiving inputs from inter prediction module 122 and intra prediction module 128. The received inputs include the residue data corresponding to different prediction modes. These residues are then transformed using a 2-dimensional transform performed by two stages of transform modules, TX0 module 204 and TX1 module 208, with a transpose operation module 206 in between. After the transform, the transformed values form a transform block. The transform coefficients are then compressed further by quantizing the coefficients via a quantization module 210.

At 404, the plurality of quantized transform coefficients for the transform unit are received and processed in a processing order. For example, the quantized transform coefficients are received and read row by row from the top row to the bottom row, and for each row, the quantized transform coefficients are received and read column by column from the leftmost column to the rightmost column.

At 406, at least a portion of the plurality of quantized transform coefficients in the processing order is analyzed to identify one or more end-of-block candidate positions in the processing order. In hardware, only a portion of the rows may be processed within one cycle.

Figure 5:
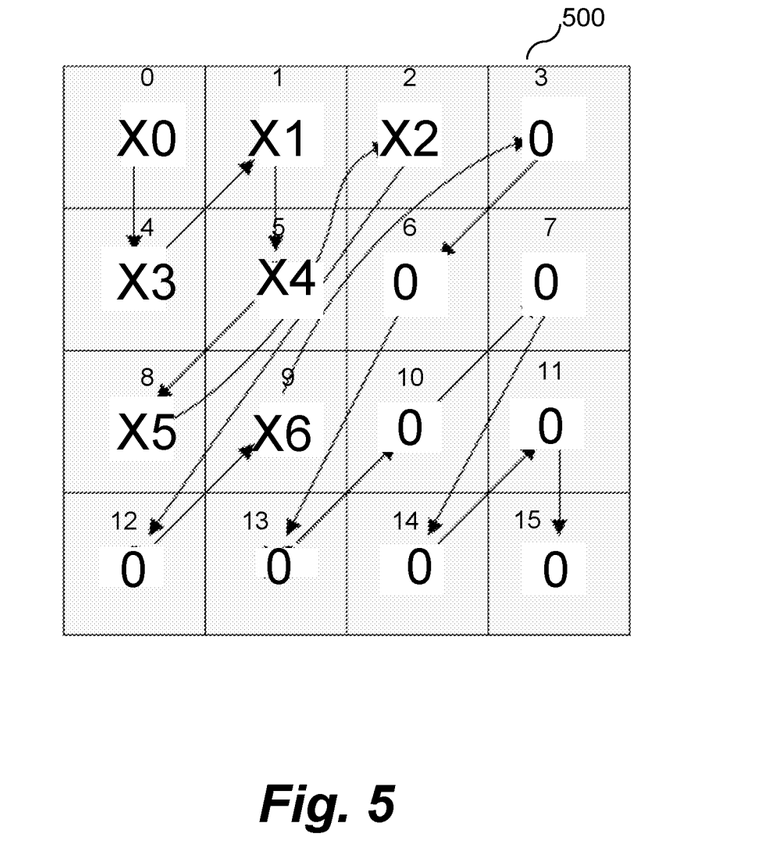
FIG. 5 illustrates one example of a 4×4 transform unit 500 with all 16 coefficients (all 4 rows) being processed within one cycle.

For a small transform unit, e.g., a 4×4 transform unit, all 16 coefficients (all 4 rows) may be processed within one cycle. The one or more end-of-block candidate positions in the processing order are the positions with non-zero quantized transform coefficients. FIG. 5 illustrates one example of a 4×4 transform unit 500 with all 16 coefficients (all 4 rows) being processed within one cycle. As shown in FIG. 5, there are seven non-zero quantized transform coefficients, including X0, X1, X2, X3, X4, X5, and X6. The seven end-of-block candidate positions in the processing order are identified as positions or indices of 0, 1, 2, 4, 5, 8, and 9. One of the seven end-of-block candidate positions is the end-of-block for the transform unit 500 of quantized transform coefficients, as will be described further below.

Figure 6A:
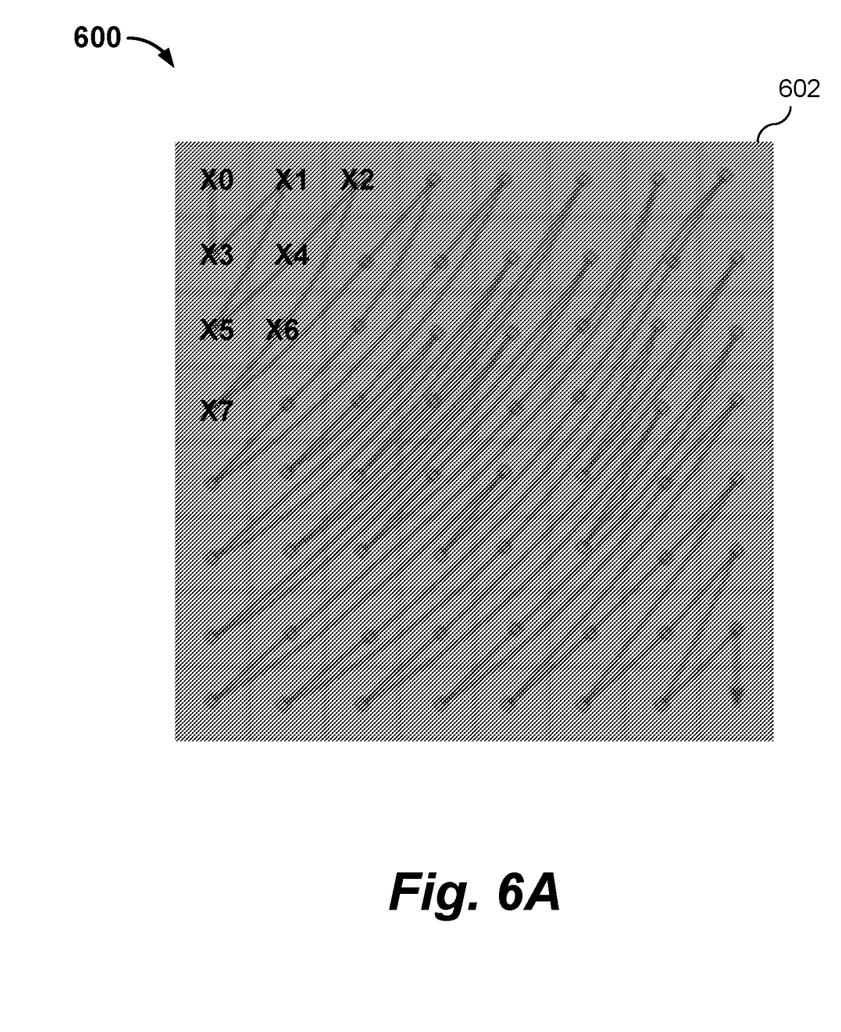
FIG. 6A illustrates another example of an 8×8 quantized transform coefficient matrix 602 with a scan order 600.
Figure 6B:
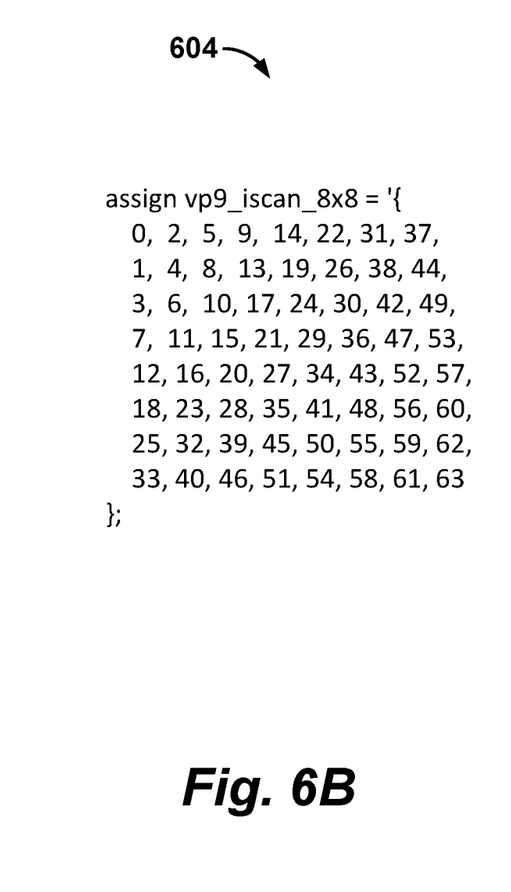
FIG. 6B illustrates a mapping table 604 that converts the indices of the coefficients in quantized transform coefficient matrix 602 to their corresponding scan order indices.

For a larger transform unit, only a portion of the rows of a quantized transform coefficient matrix may be processed within one cycle. FIG. 6A illustrates another example of an 8×8 quantized transform coefficient matrix 602 with a scan order 600. FIG. 6B illustrates a mapping table 604 that converts the indices of the coefficients in quantized transform coefficient matrix 602 to their corresponding scan order indices. As shown in FIG. 6A, there are eight non-zero quantized transform coefficients in matrix 602, including X0, X1, X2, X3, X4, X5, X6, and X7, and the remaining coefficients are zero coefficients.

For a larger 8×8 transform unit, only two of the eight rows (16 coefficients) may be processed within one cycle, and a total of four cycles are used to process all eight rows of 64 coefficients and to determine the true end-of-block. While processing the first row in the first cycle, a portion of the plurality of quantized transform coefficients in the processing order is analyzed to identify one or more end-of-block candidate positions in the processing order.

Figure 7:
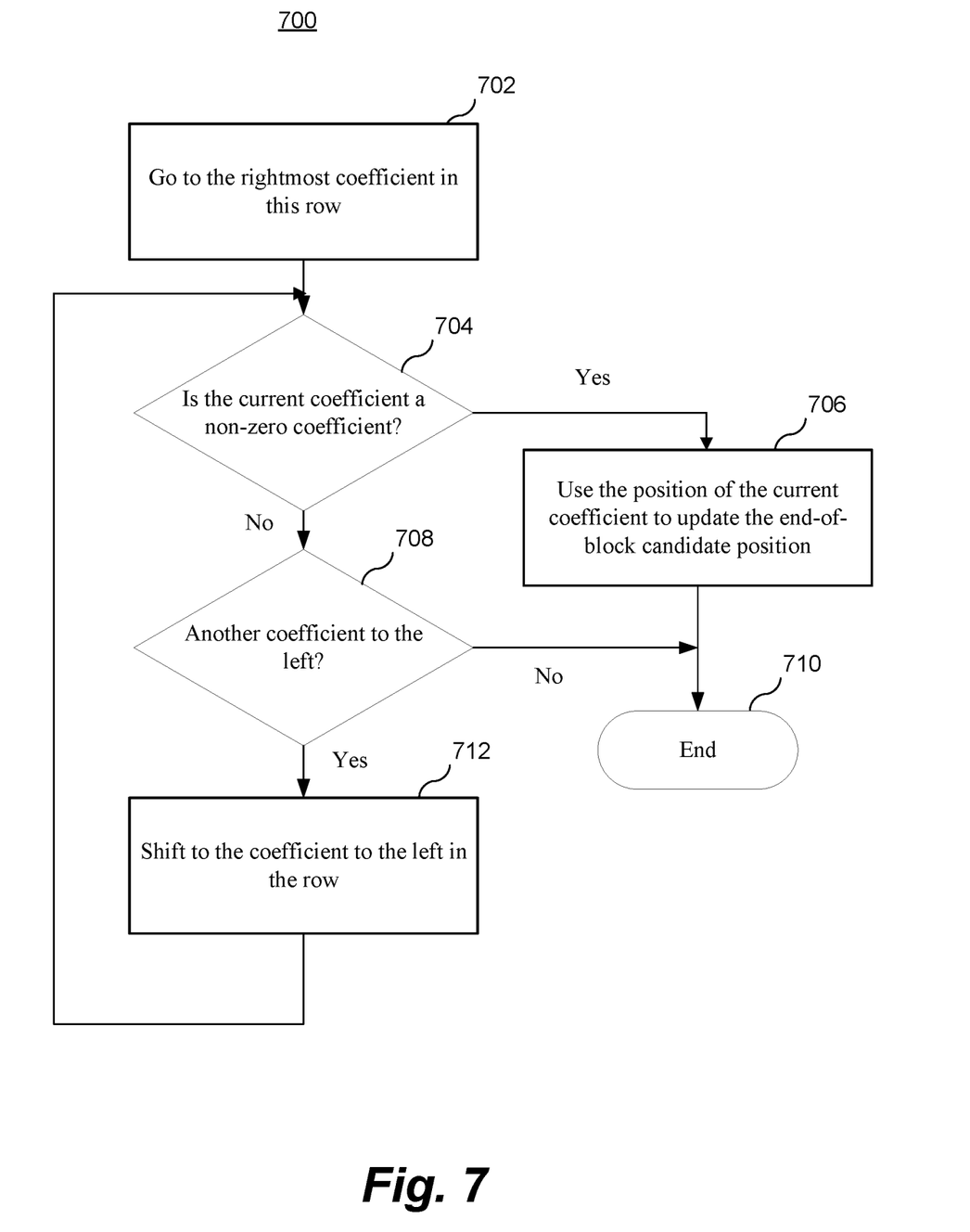
FIG. 7 illustrates an exemplary process 700 for identifying one or more end-of-block candidate positions in the processing order.

FIG. 7 illustrates an exemplary process 700 for identifying one or more end-of-block candidate positions in the processing order. Process 700 may be performed at step 406 of process 400. At step 702, after one row of the matrix is read, the search for the one or more end-of-block candidate positions is started at the rightmost coefficient in the row. In addition, the end-of-block candidate position may be initialized to zero. At step 704, it is checked if the current coefficient is a non-zero coefficient. If the current coefficient is a non-zero coefficient, then at step 706, the position of the current coefficient is used to update the end-of-block candidate position, and process 700 is terminated at 710. Otherwise, at step 708, it is checked whether there is another coefficient to the left of the current position. If there is not a coefficient to the left, then at step 710, process 700 is terminated. If there is another coefficient to the left, then at step 712, the current coefficient is shifted to the left in the row. Process 700 is then repeated at step 704 again.

Since a position to the right of any coefficient position in a given row always has a higher scan order index, the end-of-block candidate position of a row is the rightmost non-zero coefficient position. Using process 700, the rightmost non-zero coefficient in a row is searched by starting from the rightmost position in the row. If the current coefficient is zero, then the search is continued when there are more coefficients to the left. And if the current coefficient is non-zero, then the current index is marked as an end-of-block candidate position, and the search in the current row may terminate. For example, with reference to the quantized transform coefficient matrix 602, after the first row is read, the rightmost non-zero coefficient in a row is searched by starting from the rightmost position in the row. Since the five rightmost coefficients in this row are all zero coefficients, the first coefficient found to be non-zero is X2, and index 2 is marked as an end-of-block candidate position for the row.

At 408, the one or more end-of-block candidate positions for the at least a portion of the plurality of quantized transform coefficients are translated to one or more scan order versions of the one or more end-of-block candidate positions.

Continuing with the example of the 4×4 transform unit in FIG. 5, there are seven non-zero quantized transform coefficients, including X0, X1, X2, X3, X4, X5, and X6. The seven end-of-block candidate positions in the processing order are identified as positions or indices of 0, 1, 2, 4, 5, 8, and 9. These indices may be translated using a mapping table to their corresponding scan order versions of the candidate positions, which are scan order candidate indices of 0, 2, 5, 1, 3, 4, and 7, respectively.

Continuing with the example of the 8×8 transform unit in FIG. 6A, the end-of-block candidate position in the processing order has been identified as position or index 2 with the non-zero coefficient X2. The processing order index 2 is translated using mapping table 604 to its corresponding scan order version of the candidate position, which is scan order candidate index of 5.

At step 409 of process 400, it is determined whether there is another portion to process. If there are no additional portions to process, then process 400 proceeds to step 410.

At step 410 of process 400, a true end-of-block position for the plurality of quantized transform coefficients for the transform unit is determined using the one or more scan order versions of the one or more end-of-block candidate positions. Continuing with the example of the 4×4 transform unit in FIG. 5, the scan order candidate indices are 0, 2, 5, 1, 3, 4, and 7. The true end-of-block position for the plurality of quantized transform coefficients is determined to be the scan order candidate index with the largest value, i.e., 7. Then process 400 proceeds to step 412 and the process is terminated.

However, if it is determined at step 409 of process 400 that there is another portion to process, then process 400 proceeds to step 406 again and some of the steps of process 400 are repeated.

At step 406 of process 400, continuing with the example of the larger 8×8 transform unit 602, while the second row is being processed, a portion of the plurality of quantized transform coefficients in the processing order is analyzed to identify one or more end-of-block candidate positions in the processing order. For example, with reference to the quantized transform coefficient matrix 602, after the second row is read, the rightmost non-zero coefficient in a row is searched by starting from the rightmost position in the row. Since the six rightmost coefficients in this row are all zero coefficients, the first coefficient found to be non-zero is X4, and index 9 is marked as an end-of-block candidate position for the second row.

At 408, the one or more end-of-block candidate positions for the at least a portion of the plurality of quantized transform coefficients are translated to one or more scan order versions of the one or more end-of-block candidate positions. Continuing with the example of the 8×8 transform unit in FIG. 6A, the end-of-block candidate position in the processing order for the second row has been identified as position or index 9 with the non-zero coefficient X4. The processing order index 9 is translated using mapping table 604 to its corresponding scan order version of the candidate position, which is the scan order candidate index of 4.

The loop (steps 406, 408, and 409) in process 400 is repeated a plurality of times to process the remaining rows of the coefficient matrix. The third row has an end-of-block candidate position at index 17 with coefficient X6, and the fourth row has an end-of-block candidate position at index 24 with coefficient X7. The remaining rows do not have any non-zero coefficients and therefore these remaining rows have end-of-block candidate positions set to zeros.

After all the rows of the coefficient matrix have been processed, process 400 proceeds to step 410. At step 410 of process 400, a true end-of-block position for the plurality of quantized transform coefficients for the transform unit is determined using the one or more scan order versions of the one or more end-of-block candidate positions. Continuing with the example of the 8×8 transform unit in FIGS. 6A and 6B, the scan order candidate indices are 5, 4, 6, and 7. The true end-of-block position for the plurality of quantized transform coefficients is determined to be the scan order candidate index with the largest value, i.e., 7. Then process 400 proceeds to step 412 and the process is terminated.

Process 400 may be used to determine the end-of-block for other quantized transform coefficient matrices with other transform sizes. For example, for a 16×16 transform unit size, 32 coefficients (2 rows) may be processed per cycle. And the true end-of-block of the transform unit is determined in a total of eight cycles. For a 32×32 transform unit size, 32 coefficients (1 row) may be processed per cycle. The end-of-block search is one row per cycle. In each cycle, the scan order candidate index for each row is determined, and after all the rows are processed, the scan order candidate indices for all the rows are compared to select the largest scan order candidate index as the true end-of-block value.

The improved technique of determining the end-of-block for a quantized transform coefficient matrix has many benefits. There is no need to store all the rows of the quantized transform coefficient matrix and wait until the end of all the cycles before the search for the end-of-block of the quantized transform coefficient matrix may begin. The technique can support different transform sizes and throughput and is cost effective and power efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface; and
an application-specific integrated circuit video encoding unit configured in hardware to:
receive via the interface a plurality of portions of a quantized transform coefficient matrix for a transform unit of a frame of a video being encoded, wherein a portion of the plurality of portions is received at a time in a cycle, and wherein a portion includes one or more rows of the quantized transform coefficient matrix received in a raster order, wherein the raster order is different from a scan order;
analyze the plurality of portions of the quantized transform coefficient matrix separately and one portion at a time, and wherein for a portion of the quantized transform coefficient matrix, identify one or more non-zero quantized transform coefficients and corresponding indices in the raster order;
translate the corresponding indices in the raster order of the one or more non-zero quantized transform coefficients to indices in the scan order for the plurality of portions of the quantized transform coefficient matrix; and
determine a true end-of-block position for the quantized transform coefficient matrix for the transform unit using the indices in the scan order for the plurality of portions of the quantized transform coefficient matrix.

2. The system of claim 1, wherein the quantized transform coefficient matrix is received in the raster order row by row from a top row to a bottom row, and for a row, the quantized transform coefficient matrix is received column by column from a leftmost column to a rightmost column.

3. The system of claim 1, wherein a scan order comprises a zig-zag path that traverses a plurality of quantized transform coefficients in the quantized transform coefficient matrix, and wherein the true end-of-block position comprises a position of a last non-zero coefficient along the scan order.

4. The system of claim 1, wherein the quantized transform coefficient matrix comprises to a 4×4 quantized transform coefficient matrix, and wherein all four rows of the matrix are processed within a cycle.

5. The system of claim 1, wherein the true end-of-block position is determined to be an index among the indices in the scan order for the plurality of portions of the quantized transform coefficient matrix that has a largest value.

6. The system of claim 1, wherein the quantized transform coefficient matrix comprises an 8×8 quantized transform coefficient matrix, and wherein two rows of the matrix are processed within a cycle.

7. The system of claim 6, wherein the one or more non-zero quantized transform coefficients comprises a rightmost non-zero coefficient in a row.

8. The system of claim 7, wherein the true end-of-block position is determined to be an index among the indices in the scan order for the plurality of portions of the quantized transform coefficient matrix that has a largest value.

9. The system of claim 1, wherein the quantized transform coefficient matrix comprises a 16×16 quantized transform coefficient matrix, and wherein two rows of the matrix are processed within a cycle.

10. The system of claim 1, wherein the quantized transform coefficient matrix comprises a 32×32 quantized transform coefficient matrix, and wherein a row of the matrix is processed within a cycle.

11. A system, comprising:
a processor configured to:
receive a plurality of portions of a quantized transform coefficient matrix for a transform unit of a frame of a video being encoded, wherein a portion of the plurality of portions is received at a time in a cycle, and wherein a portion includes one or more rows of the quantized transform coefficient matrix received in a raster order, wherein the raster order is different from a scan order;
analyze the plurality of portions of the quantized transform coefficient matrix separately and one portion at a time, and wherein for a portion of the quantized transform coefficient matrix, identify one or more non-zero quantized transform coefficients and corresponding indices in the raster order;
translate the corresponding indices in the raster order of the one or more non-zero quantized transform coefficients to indices in the scan order for the plurality of portions of the quantized transform coefficient matrix; and
determine a true end-of-block position for the quantized transform coefficient matrix for the transform unit using the indices in the scan order for the plurality of portions of the quantized transform coefficient matrix; and
a memory coupled to the processor and configured to provide the processor with instructions.

12. A method, comprising:
receiving a plurality of portions of a quantized transform coefficient matrix for a transform unit of a frame of a video being encoded, wherein a portion of the plurality of portions is received at a time in a cycle, and wherein a portion includes one or more rows of the quantized transform coefficient matrix received in a raster order, wherein the raster order is different from a scan order;
analyzing the plurality of portions of the quantized transform coefficient matrix separately and one portion at a time, and wherein for a portion of the quantized transform coefficient matrix, identifying one or more non-zero quantized transform coefficients and corresponding indices in the raster order;
translating the corresponding indices in the raster order of the one or more non-zero quantized transform coefficients to indices in the scan order for the plurality of portions of the quantized transform coefficient matrix; and
determining a true end-of-block position for the quantized transform coefficient matrix for the transform unit using the indices in the scan order for the plurality of portions of the quantized transform coefficient matrix.

13. The method of claim 12, further comprising:
Receiving the quantized transform coefficient matrix in the raster order row by row from a top row to a bottom row, and for arow, receiving the quantized transform coefficient matrix column by column from a leftmost column to a rightmost column.

14. The method of claim 12, wherein the quantized transform coefficient matrix comprises a 4×4 quantized transform coefficient matrix, and wherein all four rows of the matrix are processed within a cycle.

15. The method of claim 12, wherein the true end-of-block position is determined to be an index among the indices in the scan order for the plurality of portions of the quantized transform coefficient matrix that has a largest value.

16. The method of claim 12, wherein the quantized transform coefficient matrix comprises an 8×8 quantized transform coefficient matrix, and wherein two rows of the matrix are processed within a cycle.

17. The method of claim 16, wherein the one or more non-zero quantized transform coefficients comprises a rightmost non-zero coefficient in a row.

18. The method of claim 17, wherein the true end-of-block position is determined to be an index among the indices in the scan order for the plurality of portions of the quantized transform coefficient matrix that has a largest value.

19. The method of claim 12, wherein the quantized transform coefficient matrix comprises a 16×16 quantized transform coefficient matrix, and wherein two rows of the matrix are processed within a cycle.

20. The method of claim 12, wherein the quantized transform coefficient matrix comprises a 32×32 quantized transform coefficient matrix, and wherein a row of the matrix is processed within a cycle.

* * * * *